United States Patent
Leferink et al.

(10) Patent No.: US 9,933,011 B2
(45) Date of Patent: Apr. 3, 2018

(54) PIVOT LINKAGE DEVICE WITH BEARINGS COMPRISING MEANS FOR PROTECTION AGAINST HIGH VOLTAGE TRANSIENTS

(71) Applicant: Thales Nederland B.V., Hengelo (NL)

(72) Inventors: Frank Leferink, De Lutte (NL); Edwin Leonardus Josephus Hogeman, Weerselo (NL)

(73) Assignee: THALES NEDERLAND B.V., Hengelo (NL)

( * ) Notice: Subject to any disclaimer, the term of this patent is extended or adjusted under 35 U.S.C. 154(b) by 0 days.

(21) Appl. No.: 14/367,166

(22) PCT Filed: Dec. 17, 2012

(86) PCT No.: PCT/EP2012/075845
§ 371 (c)(1),
(2) Date: Jun. 19, 2014

(87) PCT Pub. No.: WO2013/092520
PCT Pub. Date: Jun. 27, 2013

(65) Prior Publication Data
US 2015/0003767 A1    Jan. 1, 2015

(30) Foreign Application Priority Data
Dec. 21, 2011    (EP) .................................. 11195056.4

(51) Int. Cl.
*F16C 41/00*    (2006.01)
*F16C 25/08*    (2006.01)
(Continued)

(52) U.S. Cl.
CPC .............. *F16C 25/08* (2013.01); *F16C 41/00* (2013.01); *F16C 41/002* (2013.01);
(Continued)

(58) Field of Classification Search
CPC ...... F16C 25/083; F16C 41/002; F16C 19/28; F16C 19/52; H01R 39/643
(Continued)

(56) References Cited

U.S. PATENT DOCUMENTS 3,581,267 A    5/1971  Schreffler
4,668,109 A *  5/1987  Basso .................. F03D 1/0658
                                                    384/473
(Continued)

FOREIGN PATENT DOCUMENTS

DE    102009036856        2/2011
EP      2687421 A1 *     1/2014  .......... B60R 16/027
GB      2002859           2/1979

OTHER PUBLICATIONS

International Search Report and Written Opinion for PCT/EP2012/075845 dated Mar. 15, 2013.

*Primary Examiner* — Phillip A Johnson
(74) *Attorney, Agent, or Firm* — Snell & Wilmer L.L.P.

(57) ABSTRACT

The current invention relates to a pivot linkage device comprising at least one rolling bearing comprising at least one inner cage, one outer cage and a plurality of rolling elements denoted as the bearing components, the device further comprising means for protection against high voltage transients, wherein said protection means are exclusively formed by said bearing components, said bearing components being loaded by loading means arranged in such a manner that a direct electrical connection exists between these components. The current invention also relates to a method for protecting a bearing against high voltage transients by applying a preloading to the bearing's components.

10 Claims, 3 Drawing Sheets

Figure 1:
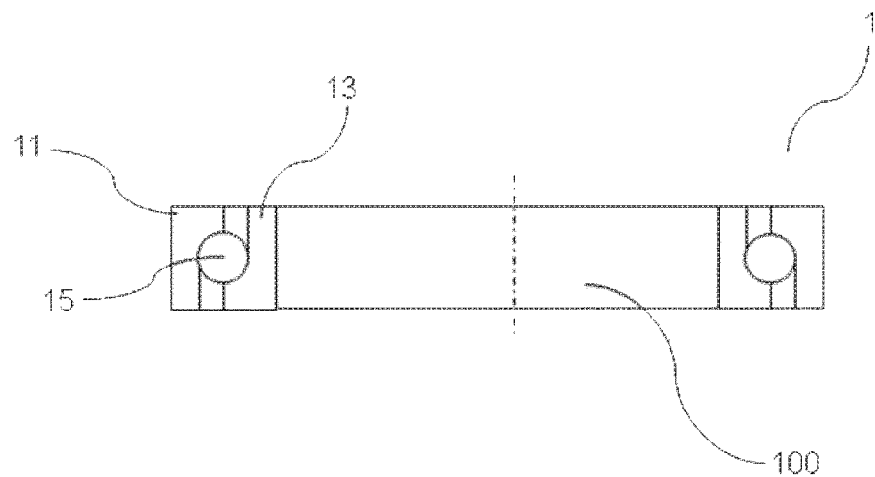

(51) Int. Cl.
*H01R 13/66* (2006.01)
*H01R 39/64* (2006.01)

(52) U.S. Cl.
CPC ......... *H01R 13/6666* (2013.01); *H01R 39/64* (2013.01); *H01R 39/643* (2013.01)

(58) Field of Classification Search
USPC ........................................ 384/476, 517, 518
See application file for complete search history.

(56) References Cited

U.S. PATENT DOCUMENTS

| | | | | |
|---|---|---|---|---|
| 5,030,016 | A * | 7/1991 | Schoeffter | B64G 1/222 29/898.09 |
| 5,853,294 | A | 12/1998 | Rehder | |
| 5,914,547 | A * | 6/1999 | Barahia | H02K 7/08 310/71 |
| 6,102,574 | A | 8/2000 | Proeschel | |
| 7,237,962 | B2 * | 7/2007 | Zernikow | F16C 19/54 384/518 |
| 2007/0154126 | A1 * | 7/2007 | Ito | F16C 19/163 384/516 |
| 2011/0019953 | A1 | 1/2011 | Nuissl | |

* cited by examiner

F, F': load Forces

PIVOT LINKAGE DEVICE WITH BEARINGS COMPRISING MEANS FOR PROTECTION AGAINST HIGH VOLTAGE TRANSIENTS

CROSS-REFERENCE TO RELATED APPLICATIONS

This application is a U.S. national phase filing under 35 U.S.C. § 371 of PCT/EP2012/075845 filed Dec. 17, 2012 and claims priority from EP Application No. 11195056.4 which was filed on Dec. 21, 2011, all of which are incorporated herein by reference in their entirety.

The current invention relates to a pivot linkage device having bearings comprising means for protection against high voltage transients, such as those induced by lightning strikes. It more particularly applies to devices using rolling bearings, for instance windmills or wind turbines, or radar systems, notably likely to be subjected to direct or indirect lightning strikes, or electric or hybrid vehicles, notably likely to be subjected to sources of high voltages generated by the electrical drive system. The current invention also relates to a method for protecting a bearing from high voltage transients, such as those induced by lightning strikes.

Lightning is a serious source of damage caused to bearings. Indeed, high voltage transients across bearings are likely to cause damages, such as pits and holes in the balls or rollers, or other components of rolling bearings, such as inner race, outer race and cage. Indeed, the rotating and static parts of a rolling bearing in operation are always separated by a lubrication film formed by a thin layer of lubricant, such as oil. When a lightning strike occurs, a high voltage may build up until a breakdown of the electrical field occurs, and a high current flows between these parts, causing damages to the components it flows through. Rotating structures such as windmills or radar systems for instance, comprise rolling bearings, such as roller bearings, and as tall structures, are likely to be subjected to lightning strikes.

Therefore protecting rolling bearings is a serious challenge, notably in technical domains where the rolling bearings may be subjected to high voltage transients. For example an international standard, namely EN-IEC 61400-24:2010, sets up requirements in terms of lightning protection of wind turbine generators and wind power systems. This standard notably states that bearings shall be either equipped with protections against lightning strikes, or qualified for withstanding exposure to an expected number of lightning current penetrations over the whole design lifetime.

A known solution for protecting rolling bearings consists of using electrically conductive brushes, which allow establishing a permanent conducting path between the inner and outer races of rolling bearings. This solution requires that additional parts be comprised in the bearings, and additional built-in volume space has therefore to be dedicated to the brushes, which implies drawbacks, notably in terms of bulk and integration cost.

Moreover, the brushes necessarily wear over time, and their wearing generates dust particles likely to alter the bearing operation, which requires necessary provisions for appropriate maintenance, with a significantly expensive cost.

One aim of the current invention is to palliate at least the above mentioned drawbacks.

For that purpose, the current invention proposes a pivot linkage device comprising:

at least one rolling bearing comprising at least one inner race, one outer race and a plurality of rolling elements denoted as the bearing components, means for protection against high voltage transients, wherein said protection means are exclusively formed by said bearing components, said bearing components being loaded by loading means arranged in such a manner that a direct electrical connection exists between these components.

In an exemplary embodiment of the invention, the pivot linkage device can comprise two bearings in an opposed-mounting construction, a shaft and a housing, the inner races of the two bearings being attached to the shaft and resting on shoulders, the outer races being attached to the housing, the loading means being formed by a compression spring whose one end is attached to the housing and the other end rests upon the inner diameter of at least one of the outer races.

In an exemplary embodiment of the invention, the pivot linkage device can comprise two bearings in an opposed-mounting construction, a shaft and a housing, the inner races of the two bearings being attached to the shaft and resting on shoulders, the outer races being attached to the housing and resting on shoulders formed by grooves realized in the housing, the loading means being formed by determined dimensions of the assembly comprising the outer races, the inner races, the shoulders and the grooves, the distance between the shoulders formed by the grooves realized in the housing, combined with the distance between the shoulders formed around the shaft being configured so that the inner races tend to be put closer to each other, while the outer races tend to be put away from each other.

In an exemplary embodiment of the invention, the pivot linkage device can comprise one bearing, a shaft and a housing, the inner race of the bearing being fixed to the shaft, the outer race being fixed to the housing, the loading means being formed by force insertion of the shaft in the inner race, combined with force-insertion of the outer race in the housing.

In an exemplary embodiment of the invention, said at least one rolling bearing can be formed by a cross roller bearing comprising rollers, whose outer race can be formed by two parallel outer rings separated by a gap, the device further comprising adjustment means configured for adjusting the width of the gap, therefore adjusting the efforts applied on the rollers forming the loading means.

In an exemplary embodiment of the invention the housing can comprise two shoulders and a screw, the two parallel outer rings resting on the two shoulders, the two shoulders being formed in two distinct parts, joined by means of a screw, said adjustment means being formed by tightening or loosening of the screw.

In an exemplary embodiment of the invention, the pivot linkage device can comprise a shaft, a housing, said at least one rolling bearing being formed by a wire ball bearing, wherein a set of a plurality of balls are caged between two inner wires and two outer wires, the two outer wires resting on two shoulders formed in the housing in two distinct parts, joined by means of a screw, said adjustment means being formed by tightening or loosening of the screw.

Another object of the current invention is a wind turbine comprising at least one shaft, said shaft being rotating relatively to a housing, the rotation movement being facilitated by at least one bearing, wherein said shaft, housing and at least one bearing form a pivot linkage device following any one of the described embodiments.

Another object of the current invention is a radar system comprising at least one rotating antenna, the rotation movement being facilitated by at least one bearing, wherein it comprises at least one pivot linkage device following any one of the described embodiments.

The basic principle behind the current invention is that if a bearing is sufficiently loaded or preloaded, the loading or preloading parameters being dependent upon the type and dimensions of the bearing, then the continuous lubrication layer can be reduced to a point where an electrical conducting path can be created, directly between the bearing's inner and outer races, and balls or rollers, that is: directly between the bearing's dynamic—rotating or translating—and static parts.

Surprisingly, the absence of a continuous lubrication layer is not detrimental to the operation of the bearing, and to its resistance to ageing. The loading or preloading parameters shall be such that the whole electrical current likely to be induced by a high voltage can flow through the bearing without letting the temperature reach the melting point of the materials forming the bearing parts through which the current flows. The loading or preloading parameters are such that the thickness of the lubrication layer present between the bearing's components, such as inner and outer races and rollers, is significantly reduced to an extent that electrical current can be conducted through the bearing's components.

One advantage of the current invention is that it does not require setting up any additional built-in volume in the bearing.

Another advantage of the current invention is that no additional materials are required, and also no additional parts that could be likely to be wearing over time. According to the current invention, the bearing itself is configured in such a way that it is protected against high voltage transients.

Figure 2:
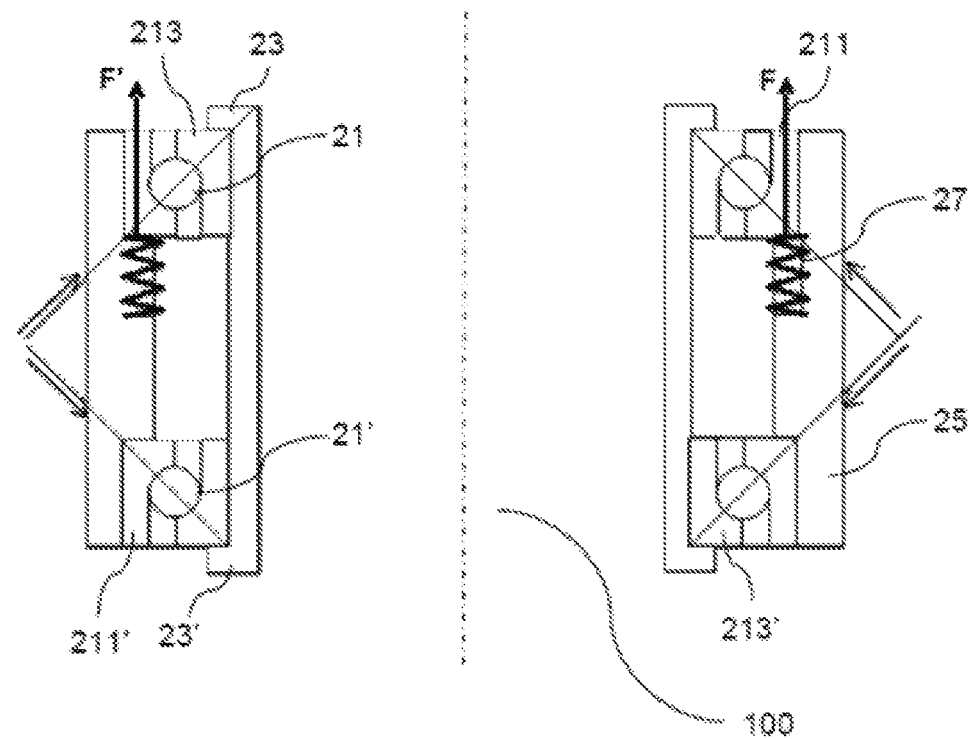
Figure 3:
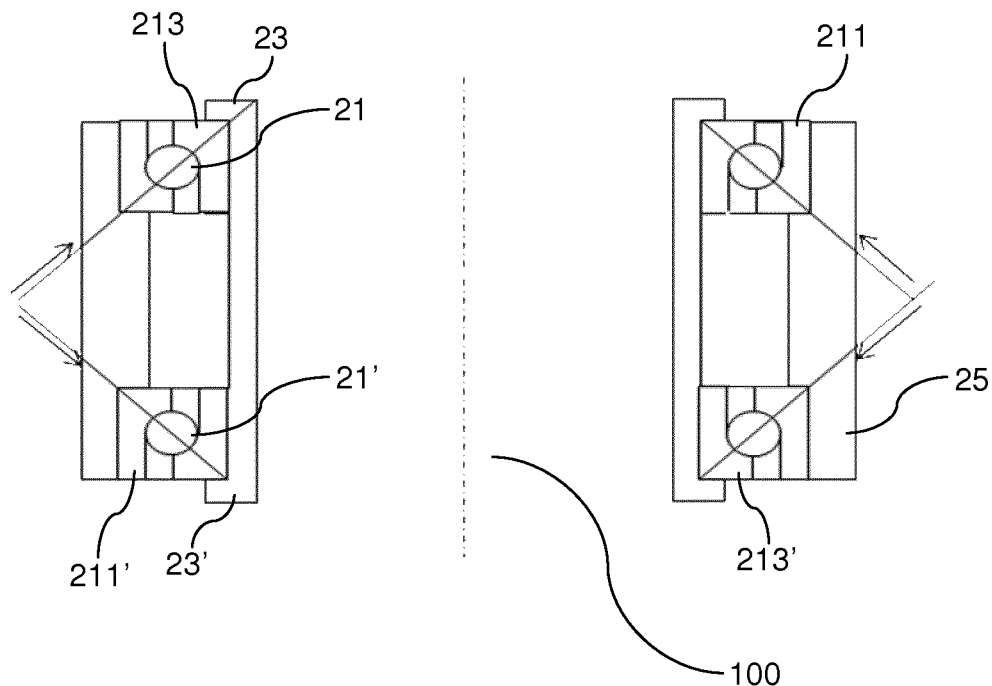
Figure 4:
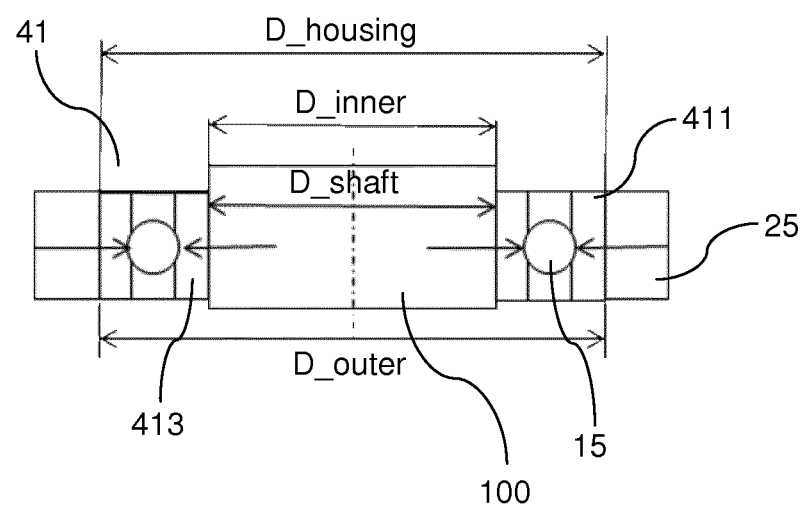
Figure 5:
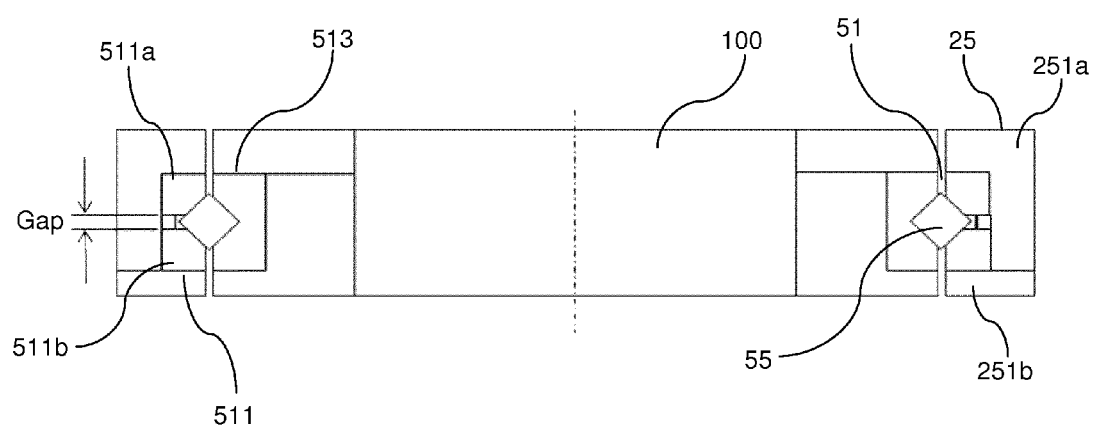
Figure 6:
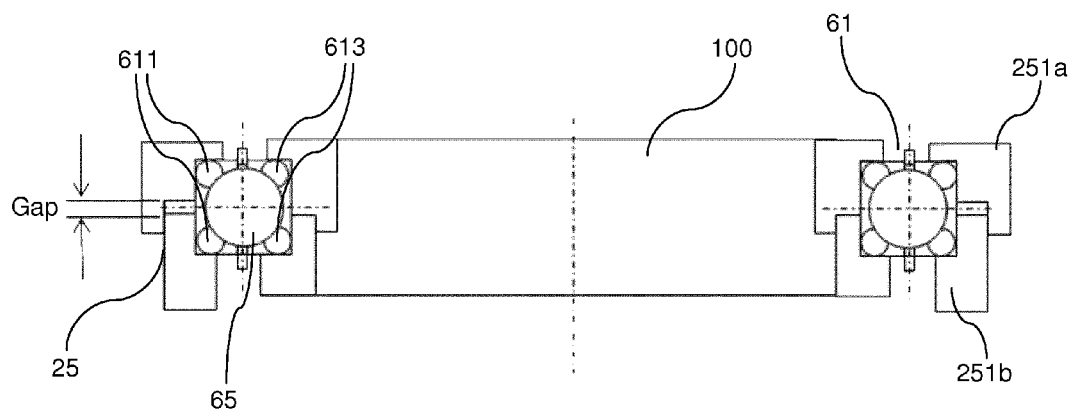

These and other characteristics and advantages of the invention will be made clearer in view of the detailed description given below of a preferred embodiment, provided by way of an illustrative and non-limiting example only, as well as the accompanying drawings which represent:

FIG. 1, a section view illustrating a known basic ball bearing;

FIG. 2, a section view illustrating a pivot linkage device comprising a setup of two bearings preloaded against each other, in a first exemplary embodiment of the invention;

FIG. 3, a section view illustrating a pivot linkage device comprising a setup of two bearings preloaded against each other, in a second exemplary embodiment of the invention;

FIG. 4, a section views illustrating a pivot linkage device comprising a setup of one preloaded bearing in a third exemplary embodiment of the invention;

FIG. 5, a section view illustrating a pivot linkage device comprising a setup of a preloaded cross roller bearing in a fourth exemplary embodiment of the invention;

FIG. 6, a section view illustrating a pivot linkage device comprising a setup of a preloaded wire ball bearing in a fifth exemplary embodiment of the invention.

FIG. 1 shows a section view illustrating a known rolling bearing, a radial ball bearing in this example.

A ball bearing typically comprises an outer race 11, an inner race 13, and a plurality of balls 15 caged between the outer race 11 and the inner race 13. Typically, the inner race 13 is fixed to a shaft 100 which is rotating around its main axis, forming part of the rotating part of a pivot linkage device. The outer race 11 is typically fixed to a hub or housing, not shown on the figure, forming the static part of the pivot linkage device. Typically, the races are ring-shaped elements, with a groove where the balls 15 can rest. Reciprocally, the shaft 100 may be static, and the housing may be rotating.

Ball bearings are usually chosen for their low cost and versatility, as they can both radial and axial loads, that is: respectively loads perpendicular to the shaft 100, and parallel to the shaft 100. The balls are typically kept in place and separated with each other by means of a cage, not shown on the figure.

Depending upon the constraints peculiar to the system, cylindrical rollers may be used instead of balls, or rollers with different shapes, such as needles, conical rollers as in tapered roller bearings, rollers that are thicker in their middles as in spherical roller bearings, or rollers with more complex structures. The current invention equally applies to all sorts of roller bearings, whatever their structure.

FIG. 2 presents a section view illustrating a pivot linkage device comprising a setup of two bearings preloaded against each other, in a first exemplary embodiment of the invention.

FIG. 2 depicts a pivot linkage device 20 comprising a typical opposed-mounting construction of two radial roller bearings 21, 21' allowing a housing 25 and a shaft 100 to be revolving around each other. For example, the setup can be a so called O-shape setup allowing the housing 25 to rotate around the shaft 100, as it is illustrated in a way not limiting of the invention.

In the illustrated setup, the outer diameter of the inner races 213, 213' of the two roller bearings 21, 21' can rest upon shoulders 23, 23', for example formed in a ring-shaped part that is fixed to the shaft 100.

According to a specificity of the current invention, the pivot linkage device 20 can comprise loading means or preloading means for loading or preloading the bearings 21, 21'. In the example illustrated by FIG. 2, means for applying a load on the bearings 21, 21', more specifically on the inner diameter of the outer races 211, 211' of the two bearings 21, 21', can be formed as part of the housing 25, for instance as grooves realized in the housing 25. For example, the inner diameter of the outer race 211' of the second bearing 21' can rest on a shoulder made as part of the housing 25, and a compression spring 27 may apply a given effort on the inner diameter of the outer race 211 of the first bearing 21: one first end of the spring 27 being attached to the housing 25, the other end of the spring 27 resting on the inner diameter of the outer race of at least one of the bearings 21, 21', for instance. In such a configuration, the load applies axial efforts, that is: efforts that are perpendicular to the shaft's main axis, tending to put the outer races 211, 211' away from each other.

The load thus applied on the bearings 21, 21' shall be sufficient for allowing a direct electrical contact between the inner race 213, 213', the outer race 211, 211' and the rolling elements of each bearing, hereinafter referred to as the "bearing components". This direct electrical contact is ensured by the absence of a lubricant layer that is normally present between the bearing components. The load shall be sufficiently weak so as not to alter the bearing's operation. As an example, the main bearing of a wind turbine, offering worst case conditions in term of thickness of the lubrication film at a rotational speed of 28 rounds per minute, can be efficiently loaded with an axial load whose force is in the order of 17.5 kN.

It shall be observed that a direct electrical path is thus allowed, not requiring the use of any additional parts, such as brushes for instance. This direct electrical forms means for protection against high voltage transients, and is allowed exclusively by the bearings, and notably through the load applied to the bearing components. This statement is true for whichever embodiment disclosed in the current application. The loading or preloading means are arranged in such a manner so that a direct electrical connection exists between the bearing components In a second embodiment of the invention illustrated by FIG. 3, defining a configuration similar to the setup illustrated by FIG. 2 described hereinabove, the loading or preloading means can be formed by an appropriate choice of the dimensions of the assembly comprising the outer races 211, 211', the inner races 213, 213', the shoulders 23 and the grooves realized in the housing 25.

For example, the distance between the shoulders formed by the grooves realized in the housing 25, combined with the distance between the shoulders 23, 23' formed around the shaft 100, for example in an intermediate part fixed to the shaft 100, can be such configured that the inner races 213, 213' tend to be put closer to each other, while the outer races 211, 211' tend to be put away from each other.

FIG. 4 presents a section views illustrating a pivot linkage device comprising a setup of one preloaded bearing in a third exemplary embodiment of the invention.

In the example illustrated by FIG. 4, a rolling bearing, for example a radial ball bearing 41 can be mounted around a shaft 100, and notably comprises an inner race 413 and an outer race 411, the inner race 413 being fixed to the shaft 100, and the outer race 411 being fixed to a housing 25. In this example, not limiting of the current invention, the housing 25 forms the static part, and the shaft 100 is rotating around its main axis.

The bearing 41 can be radially loaded by means of an appropriate choice of the dimensions of the inner and outer races 413, 411, the shaft 100 diameter and the housing 25 diameter. For instance, the shaft 100 can be force-inserted in the inner race 413, the shaft diameter D_shaft being chosen higher than the inner diameter of the inner race 413 D_inner. Similarly, the outer race 411 can be force-inserted in the housing 25, the outer diameter D_outer of the outer race 411 being chosen higher than the inner diameter D_housing of the housing 25. Hence, load efforts tend to push the inner race 413 toward the balls 15 due to the close fit of the shaft 100 with the inner race 413, and other load efforts tend to push the outer race 411 toward the balls 15 due to the close fit of the outer race 411 with the shaft 100. The precited diameters are properly chosen so that the load efforts allow a direct electrical contact between the inner race 413, outer race 411 and the balls.

FIG. 5 presents a section view illustrating a pivot linkage device comprising a setup of a preloaded cross roller bearing in a fourth exemplary embodiment of the invention.

The exemplary embodiment illustrated by FIG. 5 applies to a cross roller bearing 51. The cross roller bearing 51 basically comprises an inner race 513, an outer race 511, and a set of rollers 55, whose main axes are defining a non-null angle with a perpendicular of the shaft 100 main axis. In the illustrated example, the shaft 100 forms the rotating part, for example, and a housing 25 forms the static part. The inner race 513 can rest between two shoulders for example formed by a groove realized in an intermediate part attached to the shaft 100.

According to a specificity of this embodiment of the invention, the outer race 511 can actually be formed by two parallel outer rings 511a and 511b, separated by a gap. Each of the two parallel outer rings 511a, 511b rest on shoulders formed in the housing 25. Adjustment means can allow adjusting the width of the gap between the two parallel outer rings 511a, 511b, which both apply efforts on the rollers 55, the narrower the gap, the higher the efforts applying on the rollers 55. Here, the efforts applied on the rollers 55 form the loading or preloading means. Therefore, by adjusting the gap width, one can adjust the efforts applied on the rollers, in such a manner that a direct electrical contact can be made between the outer race 511, the rollers 55 and the inner race 513.

For example, the two shoulders formed in the housing 25 on which the two parallel outer rings 511a, 511b rest, can be actually formed in two distinct parts 251a, 251b, joined by means of a screw. The adjustment means can then be formed by the screw: tightening the screw allowing to put the two distinct parts 251a, 251b closer to each other, or in other words reduce the gap width and increase the load efforts, while loosening the screw allows to put the precited two distinct parts 251a, 251b away from each other, or in other words increase the gap width and reduce the load efforts.

FIG. 6 presents a section view illustrating a pivot linkage device comprising a setup of a preloaded wire ball bearing in a fifth exemplary embodiment of the invention.

As illustrated by FIG. 6, a wire ball bearing 61 is a rolling bearing comprising a set of a plurality of balls 65. Instead of being caged between an inner race and outer race as in the exemplary rolling bearings described hereinabove, the wire ball bearing 61 comprises two inner wires 613 acting as an inner race, and two outer wires 611 acting as an outer race. Wire ball bearings can notably withstand any directional forces and are easy to mount.

The two inner wires 613 can rest on two shoulders formed around the shaft 100, for example in an intermediate part. The two outer wires 611 can also rest on two shoulders formed in the housing 25.

In a way similar to the exemplary embodiment described hereinabove in reference to FIG. 5, the two shoulders formed in the housing 25 on which the two outer wires 611 rest, can be actually formed in two distinct parts 251a, 251b, joined by means of a screw. Means for adjusting the load on the bearing 61, which are efforts applied by the two distinct parts 251a, 251b on the two outer wires 611 in the illustrated example, can for instance be formed by a screw: tightening the screw allows to put the two distinct parts 251a, 251b closer to each other, or in other words reduce the distance between the two outer wires 611 and therefore increase the load efforts, while loosening the screw allows to put the precited two distinct parts 251a, 251b away from each other, or in other words decrease the distance between the two outer wires 611 and therefore reduce the load efforts.

A pivot linkage device according to any of the described embodiments, can notably be appropriate for a wind turbine, in which the main shaft, notably, or the shaft around which the blades are mounted, is usually associated with at least a main bearing, for example a spherical roller bearing, notably likely to be subjected to lightning strikes.

A pivot linkage device according to any of the described embodiments can also notably be appropriate for a radar system comprising a rotating antenna, for example attached to a shaft that is rotating relatively to a housing, the rotational movement being facilitated by at least one bearing, also likely to be subjected to lightning strikes.

A pivot linkage device according to any of the described embodiments, can also notably be appropriate for use in hybrid and electric cars, trains, etc., in which bearings may be subjected to high voltage transients.

Another aspect of the current invention is a method for protecting a rolling bearing against high voltage transients, comprising at least one step of applying an axial preloading or loading to said bearing components, in such a manner that a direct electrical connection exists between these components.

The applicant has performed validation tests on bearings made according to such a method. The validation tests and their results are summarized hereinafter and provide evidence on the effectiveness of protection against high voltage transients as allowed in a bearing according to an embodiment of the current invention.

In known bearings a spark can be generated through applying a high voltage, typically around 25 kV, to the rotating part of the bearing, with respect to the static part. In a bearing according to one embodiment of the current invention, it appeared to be impossible to generate such a spark, because the bearing, thanks to its specific configuration and to the applied loading or preloading, is causing a continuous conductive path. This fact lies against all common approaches which state that a bearing is isolating the rotating from the static part due to the thin oil film layer that is present between the bearing's components.

A bearing system with a bore diameter of 635 mm with an axial preload set at 17.5 kN has been proved to remain efficient, as far as its mechanical operation is concerned. This bearing has been subjected by the applicant to lightning pulses of the types denoted as A, B and C as per international standard IEC 62305-1 related to protection against lightning.

To create a lubrication film with a maximum thickness the rotational speed of the bearing was set at 28 RPM (Rounds Per Minute). Measurements of the bearing's electrical resistance before and after each "bang" showed values below 1 milli-Ohm (typically between 300 and 700 micro-Ohm). Before and after the various pulses, the operational vibrations have been measured. To test the remaining operational life of the bearing system also an endurance test has been performed. Assuming that wear is equivalent to the total number of revolutions, the bearing system is rotated at high rotational speeds (4 times maximum operational rotational speed or 112 RPM) in order to shorten the total test time. The bearing temperature is monitored to assure normal operating conditions. The endurance test is stopped after 4 weeks at normal rotational speed. The RMS values of the measured vibrations during the endurance test are shown in the table below, showing RMS-values in m/s^2 of measured vibrations along the three main axes (axial, radial and tangential) during the endurance test.

|  | Duration (h) | | | | | | | |
| --- | --- | --- | --- | --- | --- | --- | --- | --- |
|  | 0:31 | 0:58 | 2:04 | 3:37 | 5:52 | 29:52 | 53:52 | 170:58 |
| Axial | 0.790 | 0.775 | 0.769 | 0.807 | 0.796 | 0.777 | 0.740 | 0.714 |
| Radial | 0.400 | 0.406 | 0.424 | 0.641 | 0.613 | 0.627 | 0.456 | 0.429 |
| Tangential | 0.622 | 0.633 | 0.659 | 0.681 | 0.691 | 0.730 | 0.703 | 0.667 |

The differences between the subsequent measurements are of the same order of magnitude as the standard deviation of the set of measurements. The applicant observed that there are no differences in the shape of the spectra that might be caused by deterioration of the bearing-system.

The bearing used in the test setup was disassembled after the endurance test, and it appeared that the tested bearing was free of pitting or welding spots after the endurance test. In comparison, standard bearings were subjected to the same test, and appeared to be severely damaged and no longer functional.

The invention claimed is:

1. A pivot linkage device comprising a shaft and a housing, the shaft and the housing being rotatable with respect to each other,
    the pivot linkage device comprising at least one rotatable rolling bearing, each rolling bearing comprising at least one inner race, one outer race and a plurality of rolling elements, the inner race of said bearing being attached to the shaft, the outer race being attached to the housing, said rolling bearing comprising static parts and rotating parts as the rolling bearing rotates, said static parts and said rotating parts including one of the inner race and the outer race, said rotating parts further including said rolling elements, the rotating and static parts of said rolling bearing being initially separated by a lubrication layer,
    wherein the pivot linkage device applies a load to at least one of the inner race, the outer race, and the rolling elements of each rolling bearing, said load depending upon the type and dimensions of the rolling bearing,
    said load being applied to reduce the thickness of the lubrication layer to a point where a direct electrical connection is created between the rotating and the static parts of said rolling bearing, during the rotation of said rolling bearing, which protects the pivot linkage device against high voltage transients.

2. The pivot linkage device according to claim 1, wherein the pivot linkage device comprises two rolling bearings in an opposed-mounting construction, the inner races of the two rolling bearings being attached to the shaft and resting on shoulders, the outer races being attached to the housing, the pivot linkage device comprising a compression spring configured to apply said load, said load tending to put the outer races of the two rolling bearings away from each other.

3. The pivot linkage device according to claim 1, wherein the pivot linkage device comprises two rolling bearings in an opposed-mounting construction, the inner races of the two rolling bearings being attached to the shaft and resting on shoulders, the outer races being attached to the housing and resting on shoulders formed by grooves realized in the housing, the load resulting from determined dimensions of the assembly comprising the outer races, the inner races, the shoulders and the grooves, said load being generated by determining the distance between the shoulders formed by the grooves realized in the housing and the distance between the shoulders formed around the shaft so that the inner races tend to be put closer to each other, while the outer races tend to be put away from each other.

4. The pivot linkage device according to claim 1, wherein the pivot linkage device comprises one rolling bearing, the shaft being force-inserted in the inner race, and the outer race being force-inserted in the housing to apply said load as a pre-load.

5. The pivot linkage device according to claim 1, wherein said at least one rolling bearing is formed by a cross roller bearing comprising rollers, the outer race of said cross roller bearing being formed by two parallel outer rings separated by a gap having an adjustable width, said load being formed by the efforts applied on said rollers, the efforts applied on said rollers depending on the width of the gap.

6. The pivot linkage device according to claim 5, wherein the housing comprises two shoulders and a screw, the two parallel outer rings resting on the two shoulders, the two shoulders being formed in two distinct parts, joined by means of a screw, the width of said gap being adjustable by tightening or loosening of the screw.

7. The pivot linkage device according to claim 1, wherein said at least one rolling bearing is formed by a wire ball bearing, a set of a plurality of balls being caged between two inner wires and two outer wires, the two outer wires resting on two shoulders formed in the housing in two distinct parts, joined by means of a screw, said load being adjustable by tightening or loosening of the screw.

8. A method of protecting a pivot linkage device against high voltage transients, the pivot linkage device comprising a shaft and a housing, the shaft and the housing being rotatable with respect to each other, the pivot linkage device comprising at least one rotatable rolling, each rolling bearing comprising at least one inner race, one outer race and a plurality of rolling elements, the inner race of said bearing being attached to the shaft, the outer race being attached to the housing, said bearing components comprising static parts and rotating parts as the rolling bearing rotates, said static parts and said rotating parts including one of the inner race and the outer race, said rotating parts further including said rolling elements, the rotating and static parts of said rolling bearing being initially separated by a lubrication layer, wherein the method comprises a step of applying a load to at least one of the inner race, the outer race, and the rolling elements of each bearing component, said load depending upon the type and dimensions of the rolling bearing, said load being applied to reduce the thickness of the lubrication layer to a point where a direct electrical connection is created between the rotating and the static parts of said rolling bearing, during the rotation of said rolling bearing, which protects the pivot linkage device against high voltage transients.

9. A wind turbine comprising a pivot linkage device, wherein the pivot linkage device comprises a shaft and a housing, the shaft and the housing being rotatable with respect to each other, the wind turbine comprising blades mounted around the shaft of the pivot linkage device, the pivot linkage device comprising at least one rotatable rolling bearing, each rolling bearing comprising at least one inner race, one outer race and a plurality of rolling elements, the inner race of said rolling bearing being attached to the shaft, the outer race being attached to the housing, said rolling bearing comprising static parts and rotating parts as the rolling bearing rotates, said static parts and said rotating parts including one of the inner race and the outer race, said rotating parts further including said rolling elements, the rotating and static parts of said rolling bearing being initially separated by a lubrication layer, wherein the pivot linkage device is configured to apply applies a load to at least one of the inner race, the outer race, and the rolling elements of each rolling bearing, said load depending upon the type and dimensions of the rolling bearing, said load being applied to reduce the thickness of the lubrication layer to a point where a direct electrical connection is created between the rotating and the static parts of said rolling bearing, during the rotation of said rolling bearing, which protects the pivot linkage device against high voltage transients.

10. A radar system comprising at least one rotating antenna, the radar system comprising at least one a pivot linkage device, wherein the pivot linkage device comprises a shaft and a housing, the shaft and the housing being rotatable with respect to each other, the rotating antenna being attached to the shaft of the pivot linkage device, the pivot linkage device comprising at least one rotatable rolling bearing, each rolling bearing component comprising at least one inner race, one outer race and a plurality of rolling elements, the inner race of said rolling bearing being attached to the shaft, the outer race being attached to the housing, said rolling bearing comprising static parts and rotating parts as the rolling bearing rotates, said static parts and said rotating parts including one of the inner race and the outer race, said rotating parts further including said rolling elements, the rotating and static parts of said rolling bearing being initially separated by a lubrication layer, wherein the pivot linkage device applies a load to at least one of the inner race, the outer race, and the rolling elements of each bearing component, said load depending upon the type and dimensions of the rolling bearing, said load being applied to reduce the thickness of the lubrication layer to a point where a direct electrical connection is created between the rotating and the static parts of said rolling bearing, during the rotation of said rolling bearing, which protects the pivot linkage device against high voltage transients.

\* \* \* \* \*

UNITED STATES PATENT AND TRADEMARK OFFICE
CERTIFICATE OF CORRECTION

PATENT NO. : 9,933,011 B2
APPLICATION NO. : 14/367166
DATED : April 3, 2018
INVENTOR(S) : Frank Leferink and Edwin Leonardus Josephus Hogeman It is certified that error appears in the above-identified patent and that said Letters Patent is hereby corrected as shown below:

In Column 10 Line 5 please delete: "is configured to apply"

Signed and Sealed this
Third Day of July, 2018

Andrei Iancu
*Director of the United States Patent and Trademark Office*